Patented May 28, 1929.

1,715,087

UNITED STATES PATENT OFFICE.

GEORGE M. NORMAN, OF WILMINGTON, DELAWARE, ASSIGNOR TO HERCULES POWDER COMPANY, OF WILMINGTON, DELAWARE, A CORPORATION OF DELAWARE.

METHOD OF REFINING ROSIN.

No Drawing. Application filed September 25, 1926, Serial No. 137,820. Renewed December 7, 1928.

My invention relates to a process of treating rosin, both wood rosin, which, while marketable, is of a low grade, and the lower grades of gum rosin, so as to remove therefrom practically all of the objectionable coloring matter and produce a high grade rosin adapted for use in sizing the higher grades of paper and in the manufacture of the lightest colored grades of varnish and which is so thoroughly purified and refined that it is adapted for use in the manufacture of high grade rosin soaps and limed varnishes of satisfactory color, as well as for most, if not all, other purposes to which the higher grades of gum rosin are adapted.

The rosin to be purified by my process may be produced as such from either wood or gum rosin by any of the usual and well known processes, or the rosin may be purified as found in "drop liquor," which, as is well known, is produced by flooding wood stock, from which turpentine has been removed by steam, with gasoline, and which contains chiefly rosin, pine oil and various coloring bodies.

In carrying out the process embodying my invention, the rosin, especially wood rosin, may be subjected to any desired preliminary distillation process, or the rosin may be distilled after subjecting it to my refining process, but such is not necessary and is preferably omitted.

Now in accordance with my invention the rosin to be purified, in solution in a suitable solvent for example, gasoline or other light petroleum distillate, is treated with liquid sulphur dioxide for the extraction of color bodies from the rosin, it having been discovered by me that liquid sulphur dioxide has the capacity for selectively dissolving out the color bodies from the rosin.

Typical of the practice of my invention using liquid sulphur dioxide as the purifying agent, the following treatment of wood rosin will be illustrative:—

Wood rosin, produced by any of the known processes, is dissolved in a suitable solvent, for example, gasoline, to form a rosin solution containing say about 15% by weight of rosin to which is added liquid sulphur dioxide. For example, to say 400 parts of gasoline-rosin solution, containing 15% rosin, there is added 250 parts of liquid sulphur dioxide.

The rosin solution and sulphur dioxide should be thoroughly mixed, as by agitation, and it is preferable that the operation be carried on at a pressure suitable to prevent appreciable volatilization of the liquid sulphur dioxide, in a closed system which may be of any convenient design and construction.

The mixture of gasoline-rosin solution and sulphur dioxide is, after thorough mixing, cooled or refrigerated to a temperature of say $-10°$ C. and allowed to settle into layers, one of which is primarily sulphur dioxide and extracted color bodies, with a small proportion of the rosin, and the other of which is primarily gasoline and purified rosin, with a small amount of sulphur dioxide. The sulphur dioxide may be recovered for reuse by boiling it off and subsequent liquefaction by compression and cooling.

The sulphur dioxide and gasoline-rosin layers are separated, by any convenient method. The small amount of sulphur dioxide which may remain in the gasoline solution may be removed therefrom and recovered by boiling it off and liquefying by compression and cooling. The gasoline-rosin solution may be washed with water and the gasoline then distilled off for the recovery of the purified rosin. The gasoline may be recovered by condensation for reuse. The yield of purified rosin will be found to be about 74% of the original and will give a soap which will show only a small amount of discoloration with age.

The sulphur dioxide has some solvent power on rosin, hence the separated sulphur dioxide contains some rosin which may be recovered as low grade rosin, for example, by boiling off the sulphur dioxide. This recovered rosin may be refined by dissolving in gasoline and treatment with sulphur dioxide as described above, thus converting a portion of it into high grade rosin.

The preferred solvent for the rosin is the gasoline cut of petroleum, but it will be understood that any light petroleum distillate may be used unless its boiling range is above that of kerosene and it is my intention that when in the claims appended hereto gasoline is specified, the use of any operative equivalent for gasoline, which is substantially immiscible with sulphur dioxide, shall be included as an equivalent of gasoline.

The quality or grade of the rosin recovered after treatment in accordance with my invention, while depending to a certain extent upon the character of the rosin treated, will be governed mainly by the ratio of sulphur dioxide to rosin and by the temperature of agitation and separation.

Having now fully described my invention, what I claim and desire to protect by Letters Patent is:—

1. In the method of refining rosin the step which includes subjecting rosin to treatment with liquid sulphur dioxide for the removal of color bodies from the rosin.

2. In the method of refining rosin the step which includes subjecting rosin in solution to treatment with liquid sulphur dioxide for the removal of color bodies from the rosin.

3. The method of refining rosin, which includes dissolving rosin in a solvent normally substantially immiscible with liquid sulphur dioxide, treating the rosin solution with liquid sulphur dioxide for the extraction of color bodies from the rosin, separating liquid sulphur dioxide and color bodies from the rosin solution and recovering refined rosin from the rosin solution.

4. The method of refining rosin, which includes dissolving rosin in a solvent normally substantially immiscible with liquid sulphur dioxide, treating the rosin solution with liquid sulphur dioxide for the extraction of color bodies from the rosin, reducing the temperature of the rosin solution, separating liquid sulphur dioxide and color bodies from the rosin solution and recovering refined rosin from the rosin solution.

5. The method of refining rosin, which includes dissolving rosin in gasoline, treating the gasoline-rosin solution with liquid sulphur dioxide for the extraction of color bodies from the rosin, separating liquid sulphur dioxide and color bodies from the gasoline-rosin solution and recovering refined rosin from the gasoline-rosin solution.

6. The method of refining rosin, which includes dissolving rosin in gasoline, treating the gasoline-rosin solution with liquid sulphur dioxide for the extraction of color bodies from the rosin, reducing the temperature of the rosin solution, separating liquid sulphur dioxide and color bodies from the gasoline-rosin solution and recovering refined rosin from the gasoline-rosin solution.

7. The method of refining rosin, which includes dissolving rosin in a solvent normally substantially immiscible with liquid sulphur dioxide, adding liquid sulphur dioxide to the solution for the extraction of color bodies from the rosin, heating the solution to a temperature at which liquid sulphur dioxide will go into solution in the rosin solution, cooling the solution formed to a temperature at which liquid sulphur dioxide and color bodies will be thrown out of solution from the rosin solution, separating liquid sulphur dioxide and color bodies from the rosin solution and recovering refined rosin from the rosin solution.

8. The method of refining rosin, which includes dissolving rosin in gasoline, adding liquid sulphur dioxide to the gasoline-rosin solution for the extraction of color bodies from the rosin, heating the gasoline-rosin solution to a temperature at which liquid sulphur dioxide will go into solution in the gasoline-rosin solution, cooling the solution formed to a temperature at which liquid sulphur dioxide and color bodies will be thrown out of solution from the gasoline-rosin solution, separating liquid sulphur dioxide and color bodies from the gasoline-rosin solution and recovering refined rosin from the gasoline-rosin solution.

9. The method of refining rosin, which includes dissolving rosin in gasoline, adding liquid sulphur dioxide to the gasoline-rosin solution for the extraction of color bodies from the rosin, heating the gasoline-rosin solution to a temperature at which liquid sulphur dioxide will go into solution in the gasoline-rosin solution, cooling the solution formed to a temperature of about $-10°$ C., separating liquid sulphur dioxide and color bodies from the gasoline-rosin solution and recovering refined rosin from the gasoline-rosin solution.

In testimony of which invention, I have hereunto set my hand, at Wilmington, Del., on this 20th day of Sept. 1926.

GEORGE M. NORMAN.